(12) United States Patent
Honda et al.

(10) Patent No.: US 6,700,664 B1
(45) Date of Patent: Mar. 2, 2004

(54) OPTICAL CHANNEL MONITORING DEVICE

(75) Inventors: Tokuyuki Honda, Sunnyvale, CA (US); Yevgeniy Churin, San Jose, CA (US); Long Yang, Union City, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/218,418

(22) Filed: Aug. 15, 2002

(51) Int. Cl.⁷ .................................................. G01J 3/51
(52) U.S. Cl. ....................................... 356/419; 250/226
(58) Field of Search ............................ 356/419; 250/226

(56) References Cited

U.S. PATENT DOCUMENTS 5,166,755 A     11/1992  Gat .......................... 356/419
6,057,925 A      5/2000  Anthon ....................... 356/419
2002/0191294 A1 * 12/2002  Duggan ....................... 359/578

* cited by examiner

*Primary Examiner*—F. L. Evans
(74) *Attorney, Agent, or Firm*—Allen, Dyer, Doppelt, Milbrath & Gilchrist, P.A.

(57) ABSTRACT

An optical channel monitoring device uses a linear variable filter (LVF) disposed in the path of a beam of light for selectively transmitting light in a variable manner along a length of the filter, a photodetector array positioned in the path of light transmitted through the LVF for measuring spectral characteristics of the transmitted light, and collimating means disposed between the input port and the LVF for collimating said beam of light. The device is a low-cost, compact and rugged high-resolution spectrometer for various uses.

12 Claims, 4 Drawing Sheets

OPTICAL CHANNEL MONITORING DEVICE

RELATED APPLICATIONS

None

TECHNICAL FIELD

This invention relates to optical channel monitors, and more particularly to such devices utilizing a linearly variable filter (LVF).

BACKGROUND ART

The evolution of optical telecommunication systems to dynamically controlled wave-division multiplexing (WDM) networks has created a strong demand for optical channel monitoring devices. An optical channel monitoring device typically measures wavelength, power, and optical signal-to-noise ratio of each wavelength channel. It thus enables sophisticated and accurate control of the network. Some of the typical performance requirements for the state-of-the-art optical channel monitoring devices are wavelength channel resolution of 0.2 nm to 0.8 nm, wavelength accuracy of 50 to 100 pm, power accuracy of 0.5 dB, and optical signal-to-noise ratio measurement of up to 30 dB.

An optical channel-monitoring device typically consists of an optical system, electronics, and software. The function of the optical system resembles that of a spectrometer. That is, the optical system decomposes the incoming signal into wavelength or spectrum components using a dispersive element. Two types of dispersive elements that have been widely used for this purpose are gratings and Fabry-Perot etalons. In either case, the measurement is rather sensitive to a change in mechanical alignment. It is therefore a challenge to maintain required performance over long term through severe environmental changes that are assumed in most of the telecommunication applications.

Linear variable filter (LVF) is yet another type of dispersive element that has been used in the field of spectroscopy. LVF is made by depositing optical thin-film layers on a substrate in such a way that the thickness of the films varies linearly with position. The thickness variability is very small, of the order of a few microns over a few inches, or even less. The filter can be designed either as bandpass filter or high/low-cut filter. More details about LVFs can be found e.g. in U.S. Pat. No. 6,057,925 to Anthon, incorporated herein by reference. Spectral information of incoming optical signal can be obtained by placing a detector array behind the LVF (U.S. Pat. No. 5,166,755 issued to Gat, incorporated herein by reference). This approach enables rather compact and rugged mechanical design.

The use of the linear variable filter in optical channel monitoring devices, however, has been hindered by packaging problems. In particular, it has been a challenge to design a device that has sufficiently low cross talk between wavelength channels. The cross talk can be minimized by having a detector array that has much larger number of pixels than the number of channels and by making the width of the optical beam spot on the detector about as small as the pixel width. On the other hand, the width of the detector pixels in general decreases with the number of pixels in order to keep the practical size of the detector element. For example, the pixel width of the state-of-the-art 512-pixel detector array is about 25 $\mu$m. This poses a challenge in packaging. Assuming Gaussian profile of the beam, the depth of focus that is defined by Rayleigh range is only 0.3 mm for the beam diameter of 25 $\mu$m at the wavelength of 1.55 $\mu$m (B.E.A. Saleh and M.C. Teich, "Fundamentals of Photonics," John Wiley & Sons, (New York 1991), pp.86–87).

On the other hand, it is not practical to place LVF at close proximity to the detector array for a number of reasons. Depositing LVF coating on the surface of the detector array is difficult because of the delicate surface and wiring of the detector array. Placing a separate LVF element inside the detector package is also problematic since it requires the removal of a window plate that is part of a hermetic package that protects the delicate detector surface. In addition, the need for minimizing the package size of the device sometimes requires freedom to place LVF more than several millimeters away from the detector array package.

In U.S. Pat. No. 6,057,925, supra, now assigned to the same corporate assignee as the present invention, Anthon discloses the use of micro lens array between the LVF and the detector array. The Anthon method enables focusing of the optical beam on the detector array while LVF is placed at an arbitrary position. However, the introduction of the micro lens array will cause a substantial increase in packaging cost. In addition, light scattering and/or aberration around the boundary of each lens are potential problems that may increase the cross talk between wavelength channels.

Accordingly, there is a need for an optical channel-monitoring device that overcomes the above problems.

SUMMARY OF THE INVENTION

In accordance with the invention, there is provided an optical channel monitoring device comprising: an input port for launching a beam of light, a linear variable filter disposed in the path of the beam of light for selectively transmitting light in a variable manner along a length of the filter, a detector means for measuring spectral characteristics of the light transmitted through the LVF, the detector means comprising a photodetector array disposed in the path of light transmitted through the LVF in a predetermined position relative to the LVF, and collimating means disposed between the input port and the LVF for collimating said beam of light. The collimated beam of light is incident on the LVF at a negative incidence angle selected to optimize focusing of the transmitted light on the photodetector array. In an embodiment of the invention, the LVF has a wedged layer and the collimated beam of light is incident on the LVF at an angle $\theta_0$ determined according to the formula $$Z = -\frac{\lambda}{Sn^2}(\theta_0 + \Delta\theta),$$

where Z is focus position on the photodetector array, $\lambda$ is wavelength, S is wavelength slope of the LVF, n is the effective refractive index of the LVF, $\theta_0$ is incidence angle of the collimated light beam on the LVF, and $\Delta\theta$ is the half divergence angle of the output light beam from LVF.

BRIEF DESCRIPTION OF THE DRAWINGS

The invention will be described and explained in more detail by way of the following description in conjunction with the accompanying drawings showing only typical, non-limiting embodiments of the invention, and in which:

FIG. 8b is a schematic view of an embodiment similar to that of FIG. 8a.

DETAILED DESCRIPTION OF EMBODIMENTS OF THE INVENTION

The present invention is concerned with optical channel monitoring device that utilizes an LVF and a detector array. The LVF has a band-pass filter design that consists of one or more cavities. The invention is based on a finding that the focus position of the output beam from LVF can be adjusted by the incidence angle to LVF.

Figure 1:
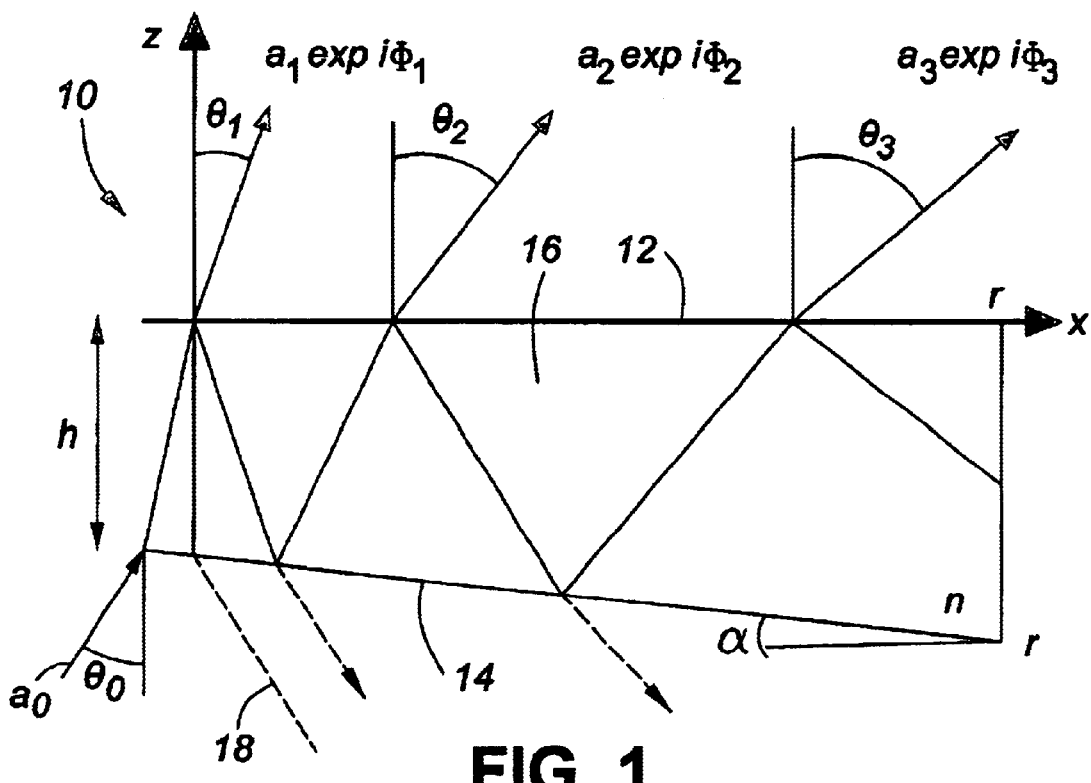
FIG. 1 illustrates a theoretical model of linear variable filter (LVF)

In general terms, the invention has, in a preferred embodiment, an optical system that converts the light from the input fiber to a nearly collimated beam and 2) a means to make the collimated beam incident on the LVF at a tailored incidence angle (usually more than 1 degree, typically 1 to 10 degrees) pointing toward the thin-film side of the LVF, i.e. slanted upwards left as schematically shown by the dotted line in FIG. 1.

The principle of the invention is explained by considering a theoretical model of LVF as shown in FIG. 1. The LVF, generally designated as 10 has generally a wedge shape and consists of two reflective layers 12, 14 and a dielectric wedged spacer layer 16 with a refractive index n. In practice, the reflective layers consist each of a number of quarter-wave dielectric layers with alternatively variable refractive index n (high n/low n/high n . . . ). The wedge-shaped spacer layers, typically of identical shape, are alternated with reflective layers. The reflective layers 12, 14 have amplitude reflectance r. The wedge angle of the spacer layer is $\alpha$, an angle typically much lower than 1°. The thickness of the spacer layer at X=0 is h. For simplicity, the coordinate position X=0 is chosen in such a way that h is an integer times $\lambda/2n$. The phase shift upon reflection is ignored since it does not change the conclusion.

The LVF is illuminated by a plane wave that has amplitude and incidence angle of $\alpha_0$ and $\theta_0$, respectively. The plane-wave components of the output beam are depicted as $\alpha_1 \exp i\Phi_1, \alpha_2 \exp i\Phi_2, \ldots$, where $\alpha_N$ is the amplitude and $\Phi_N$ is the phase at X=Z=0. The amplitude and phase can approximately be written as, under the assumption that the wedge angle and the incidence angle are relatively small, $$a_N = a_0 r^{2(N-1)}(1-r^2)^2, \qquad (1)$$

$$\Phi_N = \frac{\pi h}{3\alpha n^2 \lambda}\theta_N^3 + \frac{2\pi h}{\alpha \lambda}\theta_N + C \qquad (2)$$

where $\theta_N$ is the propagation direction of the Nth plane-wave components and C is a constant phase that does not depend on the propagation direction. The focus position Z can be calculated by using the fact that the propagation of plane-wave components introduces phase shift that is approximately quadratic to the propagation angle (J. W. Goodman, "Fourier Optics," 2$^{nd}$ ed., McGraw Hill (New York, 1996) pp. 57–58):

$$Z = -\frac{\lambda}{2\pi}\frac{d^2\Phi_M}{d\theta_N^2} \qquad (3)$$

Here, we choose the propagation direction that corresponds to the direction of the output beam from the LVF. This means that $$\theta_N = \theta_0 + \Delta\theta \qquad (4)$$

where $\Delta\theta$ is half divergence angle of the output beam from the LVF.

By using Eq. (2), (3), and (4) it follows that $$Z = -\frac{h}{\alpha n^2}(\theta_0 + \Delta\theta) \qquad (5)$$

Eq. (5) shows that the focus position Z has a linear dependence on the incidence angle $\theta_0$. Therefore, one can adjust the focus position without additional optical elements by simply adjusting the incidence angle to the LVF. The incidence angle $\theta_0$ for positive focus position Z is negative. This means that the incident beam should be directed toward the thin-film side of LVF, i.e. inclined left as schematically presented by the dotted line 18. It is noted that the incidence angle for Z=0 is non-zero. That is, the incidence angle that gives the narrowest beam width is not zero if the detection plane is right behind LVF. It is often convenient to characterize LVF with wavelength slope S (i.e., wavelength shift per length). Eq. (5) can be re-written by using the wavelength slope S as $$Z = -\frac{\lambda}{Sn^2}(\theta_0 + \Delta\theta) \qquad (6)$$

In practice, effective refractive index should be used in place of the refractive index of the spacer layer taking into account the fact that the reflective layers are also affected by the incidence angle. The calculation method of the effective refractive index for band-pass filters is explained in H. A. Macleod, "Thin Film Optical Filters," 2$^{nd}$ Ed., McGraw-Hill (New York 1986) pp. 260–265.

Figure 2:
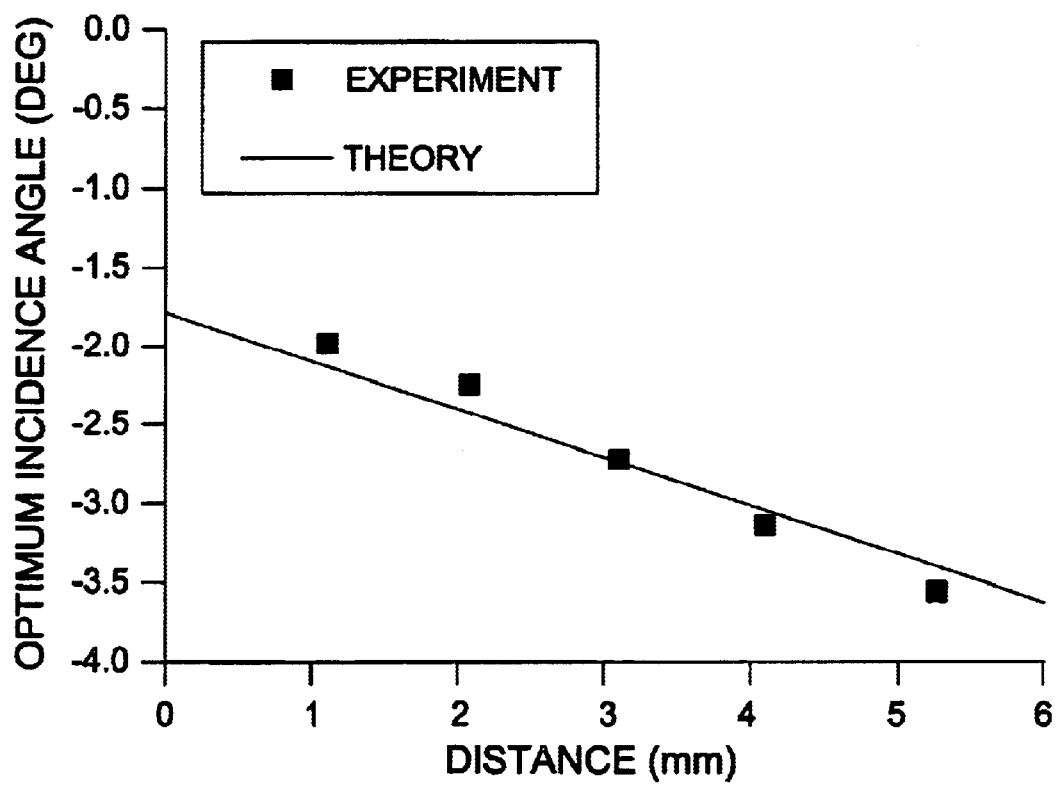
FIG. 2 is a graph of optimum incidence angle as a function of distance from LVF.

FIG. 2 shows an example of the optimum incidence angle that gives focusing on a detector as a function of the distance between the detector and an LVF. An experiment was conducted with a band-pass LVF that had spectral width of about 0.1 nm. Experimental results agreed with the theoretical data fairly well (FIG. 2). Here, the optimum incidence angle was determined by the narrowest beam width on the detector. The theoretical line was calculated by using Eq. (6). The wavelength slope was S=2.6 nm/mm, effective refractive index was n=1.7, and the wavelength was 1550 nm.

As already stated herein, one of the important considerations of the present invention is an optical design that ensures that the incidence angle on the LVF satisfies the relationship of Eq. (6).

It will be understood by those versed in the art that the light is treated in the LVF according to the local wavelength vs. the position on the filter. In other words, the wavelength off local resonance of the filter will pass through the filter, indeed highly attenuated, with little refraction, while wavelengths in the resonance band will be brought into a reasonable focus on corresponding pixel(s) with little cross talk.

Figure 3A:
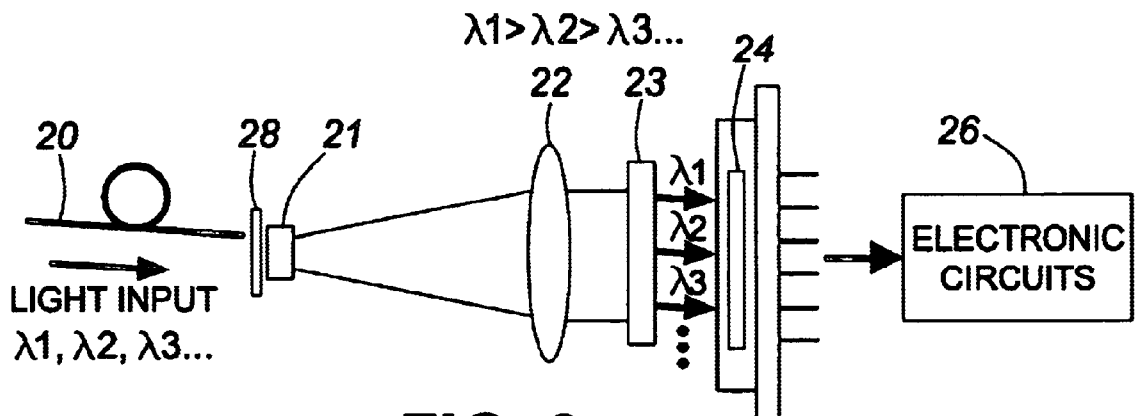
FIG. 3a is a top view of an embodiment of the monitoring device of the invention.
Figure 4:
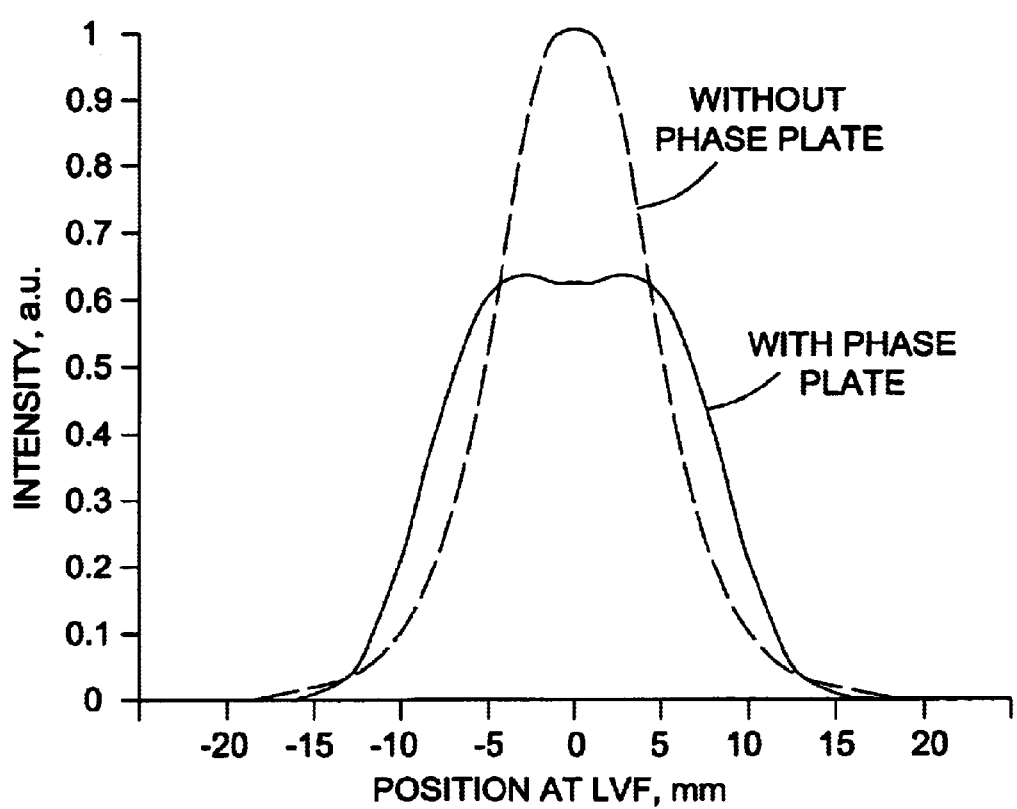

FIGS. 3a (top view) and 3b (side view) show one embodiment of the device of the invention. Optical signal input is provided by an optical fiber 20 that defines an input port. Cylindrical lenses 21 and 22 convert the light into a collimated beam that illuminates LVF 23 at an oblique incidence angle in such a way that the beam, while distributed over a large portion of the LVF (the portion called "aperture") points toward the thin-film side of the LVF. The incidence angle on the LVF is typically 1 to 7 degrees without being limited thereto. The output beam from LVF consists of narrow beams that correspond to channel wavelengths λ1, λ2, λ3, and so on. A photodetector array 24 is placed approximately in parallel to the LVF 23 so that the propagation distance between the LVF and the detector array is constant for all the wavelengths. However, as explained herein, the photodetector may be placed angularly relative to the LVF. The width of each pixel of the detector array is typically 10 to 100 μm. The detector array may be packaged in a hermetic case, not shown. The electric signal from the detector array may be sent to an electronic circuit 26 for signal processing. The electronic circuitry for this purpose is well known in the art, and is for instance described in the Gat patent, supra. In addition, a phase mask 28 may be placed close to the face (input port) of the input fiber to improve the uniformity of beam intensity on the photodetector array (I. Gur and D. Mendlovich, Opt. Commun. 145, p. 237, 1998). For wavelength around 1.55 μm, for example, a simple rectangular phase mask ("phase plate") with the phase step of π and the width of 14 μm can reshape the intensity profile from a typical single-mode fiber as shown in FIG. 4. It can be seen that the intensity response is significantly changed (flattened) compared to the original Gaussian shape.

When the light beam incident on LVF has a collimation error, i.e., the beam is slightly divergent or convergent, the incidence angle will not be uniform over the length of LVF. In this case, the variation of incidence angle can be compensated for by making the detector array non-parallel to the LVF The distance between the detector array and the LVF should be made larger on the side that has larger (in magnitude) incidence angle so that the relationship of Eq. (6) is satisfied over the length of LVF.

Figure 3B:
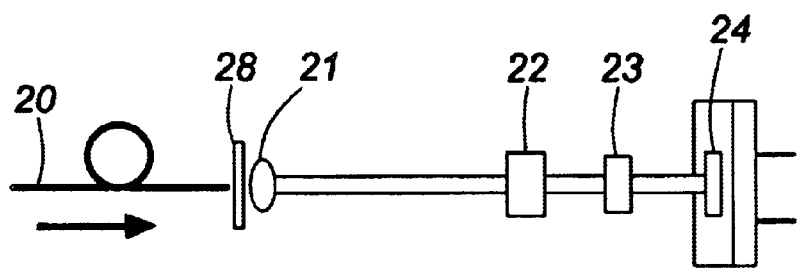
FIG. 3b is a side view of the embodiment of FIG. 3a, FIG. 4 is a graph showing the beam intensity profile from a single-mode fiber as a function of the position at LVF, with or without a phase mask.
Figure 5A:
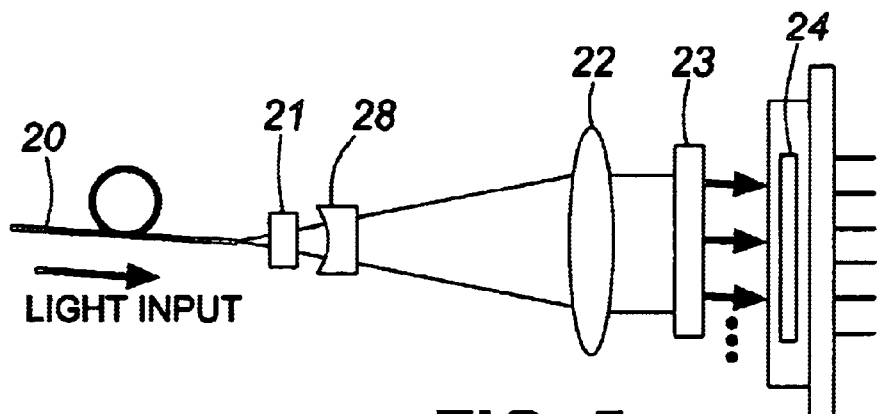
FIGS. 5a and 5b are a top view and side view, respectively, of another embodiment of the invention.
Figure 5B:
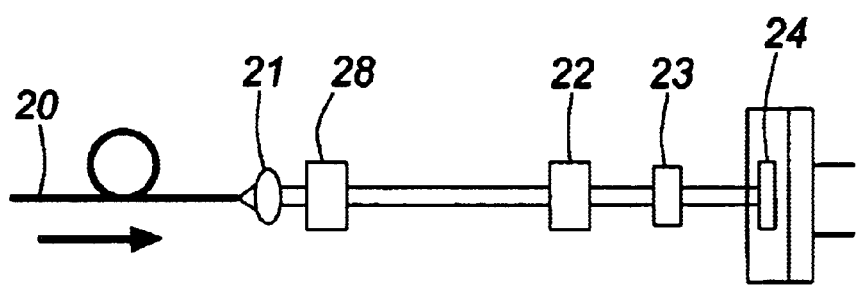

The package length of the optical system in FIGS. 3a and 3b is largely determined by the requirement that the width of the incident beam on LVF is larger than the length of the aperture of the LVF (which generally corresponds to the size of the photodetector array behind it). The width of the beam is limited by the numerical aperture (NA) of the input fiber 20 and the focal length of the cylindrical lens 22. Therefore, a shorter package length requires a higher fiber NA. Alternatively, one can insert a negative lens 28 (which may be cylindrical) between the input fiber 20 and the cylindrical lens 22 as shown in FIGS. 5a and 5b in order to reduce the package length without increasing the fiber NA.

Figure 6A:
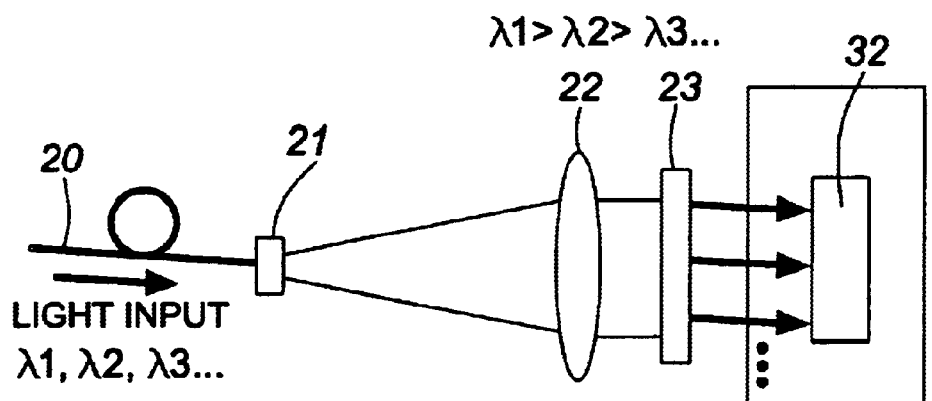
FIGS. 6a and 6b are a top view and side view, respectively, of yet another embodiment of the device.
Figure 6B:
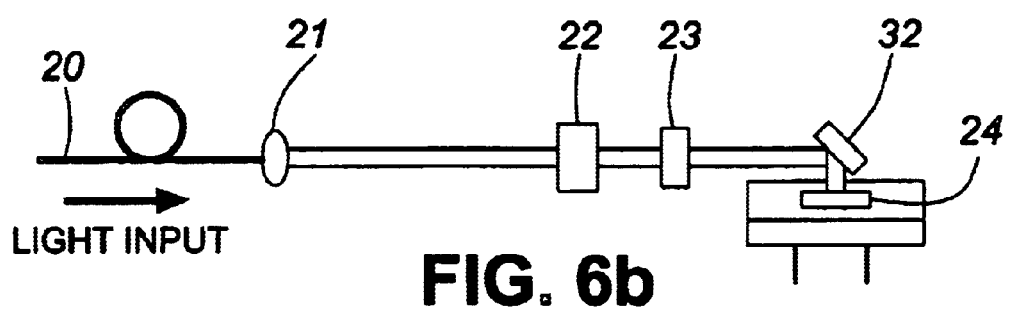
Figure 7A:
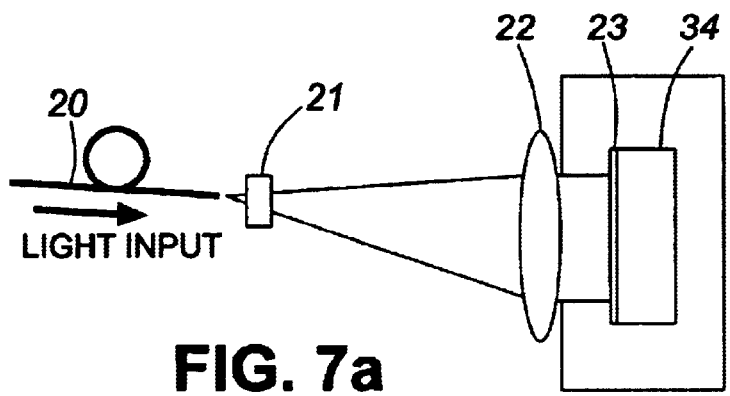
FIGS. 7a and 7b are a top view and side view, respectively, of still another embodiment of the device.
Figure 7B:
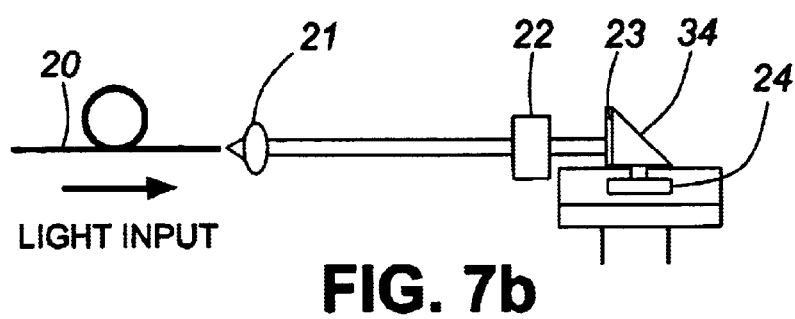

The focus adjustment with incidence angle enables the placement of the detector array 24 at an arbitrary distance from the LVF 23. This allows one to place an additional element between the LVF and the detector without sacrificing wavelength resolution. In one embodiment, a folding mirror 32 can be placed between the LVF and the detector as shown in FIGS. 6a and 6b. This design can be used to reduce the package height of the optical system. Alternatively, a prism 34 may be used in place of a folding mirror 32. In this case, a LVF 23 may be directly deposited on a glass prism as shown in FIGS. 7a and 7b.

Figure 8A:
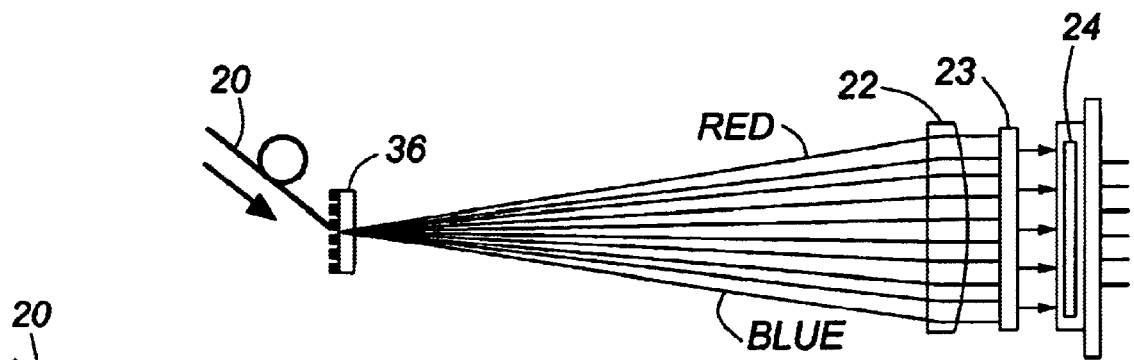
FIG. 8a is a schematic view of an embodiment utilizing a diffraction grating.
Figure 8B:
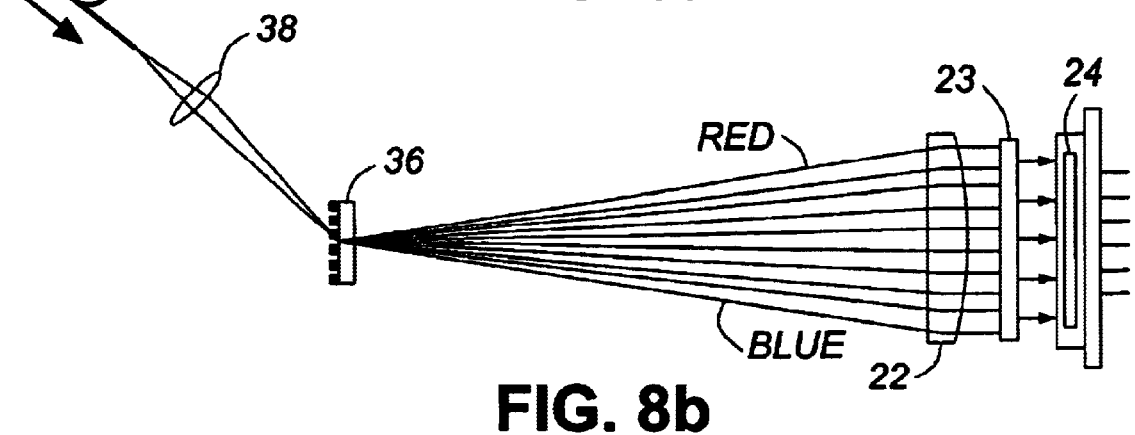

The optical throughput (i.e., energy efficiency) of the device may be improved by the use of a diffraction grating close to the face of the input fiber. This is based on the fact that the transmittance of the LVF is approximately equal to the ratio of the transmitted beam width to the incident beam width. The grating allows one to cover the length of LVF with narrower, multiple incidence beams. FIGS. 8a and 8b show optical designs of the present invention using a diffraction grating 36. The energy efficiency of the device increases with the decrease of the numerical aperture of the input light on the grating. Inserting a positive lens 38 in front of the input fiber and placing the grating around the image of the face of the input fiber can decrease the numerical aperture and thus can increase the energy efficiency (FIG. 8b). To obtain the most linear dependence of diffraction angle versus wavelength, the central wavelength of operating spectral range should diffract normally to the grating surface.

It is an advantage of the invention that it offers a relatively high accuracy of wavelength and power measurement compared to the devices known to date.

The device offers a small package size at a relatively low cost, and relatively high reliability due to simple design. It is applicable to spectrometers in other fields than telecommunications such as chemical industry, various medial applications, environment sensing, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An optical channel monitoring device comprising:
   an input port for launching a beam of light,
   a linear variable filter (LVF) disposed in the path of the beam of light for selectively transmitting light in a variable manner along a length of the filter,
   a detector means for measuring spectral characteristics of the light transmitted through the LVF, the detector means comprising a photodetector array disposed in the path of light transmitted through the LVF in a predetermined position relative to the LVF, and
   collimating means disposed between the input port and the LVF for collimating said beam of light,
   wherein the collimated beam of light is incident on the LVF at a negative incidence angle selected to optimize focusing of the transmitted light on the photodetector array.

2. The monitoring device of claim 1 wherein the LVF has a wedge shape and the collimated beam of light is incident on the LVF at an angle determined according to the formula $$Z = -\frac{\lambda}{Sn^2}(\theta_0 + \Delta\theta),$$

where Z is focus position on the photodetector array, λ is wavelength, S is wavelength slope of the LVF, n is the effective refractive index of the LVF, $\theta_0$ is incidence angle of the collimated light beam on the LVF, and $\Delta\theta$ is the half divergence angle of the output light beam from LVF.

3. The monitoring device of claim 1 wherein the angle is more than one degree.

4. The monitoring device according to claim 1 further comprising a phase mask disposed in the light beam path between the input port and the collimating means for modifying intensity profile of the light beam.

5. The monitoring device of claim 1 wherein the linear variable filter comprises at least one light transparent wedged spacer sandwiched between two reflective layers.

6. The monitoring device of claim 1 further comprising a dispersive element disposed in the path of the light beam between the input port and the LVF.

7. The device of claim 6 wherein the dispersive element is a diffraction grating.

8. The device of claim 7 further comprising a focusing lens between the input port and the grating, wherein the grating is disposed about the image of the input port.

9. The device of claim 1 wherein the collimating means comprises two positive cylindrical lenses.

10. The device of claim 9 wherein the collimating means further comprises a negative cylindrical lens.

11. The device of claim 1 further comprising a mirror disposed between the LVF and the detector means for diverting the path of the transmitted light and reducing an overall length of the device.

12. The device of claim 3 wherein the angle is between 1 degree and about 10 degrees.

* * * * *

UNITED STATES PATENT AND TRADEMARK OFFICE
CERTIFICATE OF CORRECTION

PATENT NO. : 6,700,664 B1
DATED : March 2, 2004
INVENTOR(S) : Honda et al.

It is certified that error appears in the above-identified patent and that said Letters Patent is hereby corrected as shown below:

Column 3,
Line 53, "$\alpha_0$" should read -- $\alpha_0$ --
Line 55, "$a_1$ exp$i\Phi_1$, $a_2$ exp$i\Phi_2$, ..., where $a_N$ is" should read -- $a_1$ exp$i\Phi_1$, $a_2$ exp$i\Phi_2$, ..., where $a_N$ is --

Column 4,
Line 8, "$Z = -\frac{\lambda}{2\pi}\frac{d^2\Phi_M}{d\theta_N^2}$" should read -- $Z = -\frac{\lambda}{2\pi}\frac{d^2\Phi_N}{d\theta_N^2}$ --

Line 30, "presented" should read -- represented --

Column 5,
Line 41, "LVF The distance" should read -- LVF. The distance --

Signed and Sealed this

Twenty-third Day of November, 2004

JON W. DUDAS
*Director of the United States Patent and Trademark Office*